United States Patent
Richardson et al.

(10) Patent No.: US 6,871,398 B2
(45) Date of Patent: Mar. 29, 2005

(54) METHOD OF MANUFACTURING AN ARTICLE BY DIFFUSION BONDING

(75) Inventors: Brian Richardson, Barnoldswick (GB); Michael Green, Burnley (GB)

(73) Assignee: Rolls-Royce plc, London (GB)

( * ) Notice: Subject to any disclaimer, the term of this patent is extended or adjusted under 35 U.S.C. 154(b) by 562 days.

(21) Appl. No.: 09/948,878

(22) Filed: Sep. 10, 2001

(65) Prior Publication Data

US 2004/0118903 A1 Jun. 24, 2004

(30) Foreign Application Priority Data

Sep. 14, 2000 (GB) .............................................. 0022531

(51) Int. Cl.⁷ .......................... B21D 53/78; B23P 15/02; B23K 20/00
(52) U.S. Cl. .............. 29/889.72; 29/889.1; 29/889.721; 228/190; 228/193
(58) Field of Search ................................ 228/118, 157, 228/190, 193; 29/889.7, 889.72, 889.721

(56) References Cited

U.S. PATENT DOCUMENTS

| 4,426,032 A | | 1/1984 | Leodolter | |
|---|---|---|---|---|
| 5,323,536 A | * | 6/1994 | Fowler et al. | 29/889.72 |
| 5,469,618 A | * | 11/1995 | LeMonds et al. | 29/899.72 |
| 5,479,705 A | | 1/1996 | Fowler | |
| 5,711,068 A | * | 1/1998 | Salt | 29/889.1 |
| 5,729,901 A | | 3/1998 | Fowler | |
| 5,793,015 A | * | 8/1998 | Walczyk | 219/121.67 |
| 6,264,091 B1 | * | 7/2001 | Milburn | 228/157 |
| 6,467,168 B2 | * | 10/2002 | Wallis | 29/889.721 |

FOREIGN PATENT DOCUMENTS

| EP | 0 468 221 A | 1/1992 |
|---|---|---|
| EP | 0 601 773 A | 6/1994 |
| GB | 2269555 A | 2/1994 |
| GB | 2289429 A | 11/1995 |

* cited by examiner

Primary Examiner—Lynne R. Edmondson
(74) Attorney, Agent, or Firm—W. Warren Taltavull; Manelli Denison & Selter PLLC

(57) ABSTRACT

A method of diffusion bonding three metal work pieces to form a fan blade, where each workpiece has a flat surface and an excess portion larger than a predetermined size needed to produce a finished fan blade; longitudinally extending slots are provided to interconnect the flat surfaces of the excess portions of the work pieces; the work pieces are assembled into a stack with the flat surfaces in mating abutment and the stack is evacuated from one end of the stack through the slots; heat and pressure are applied across the thickness of the work pieces to diffusion bond the work pieces together to form an integral structure; the excess portions with the slots are then removed.

29 Claims, 2 Drawing Sheets

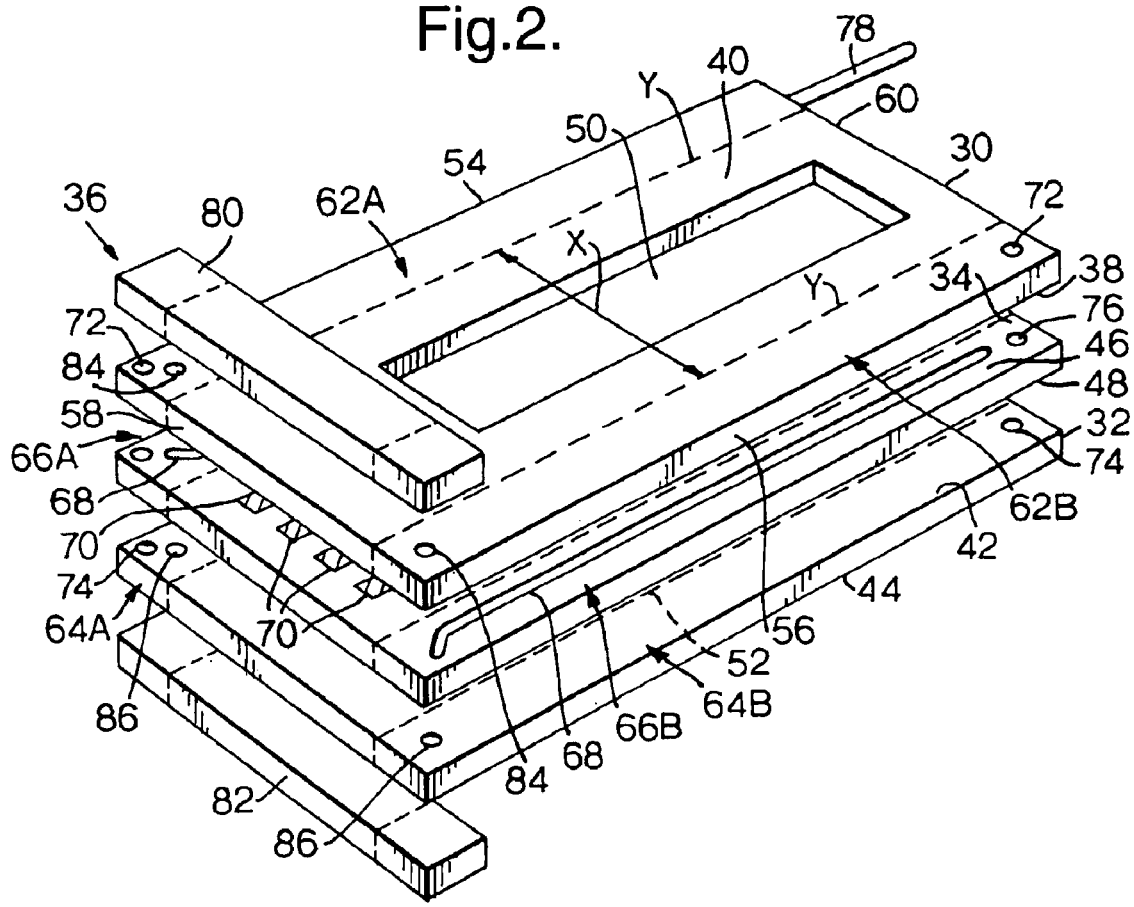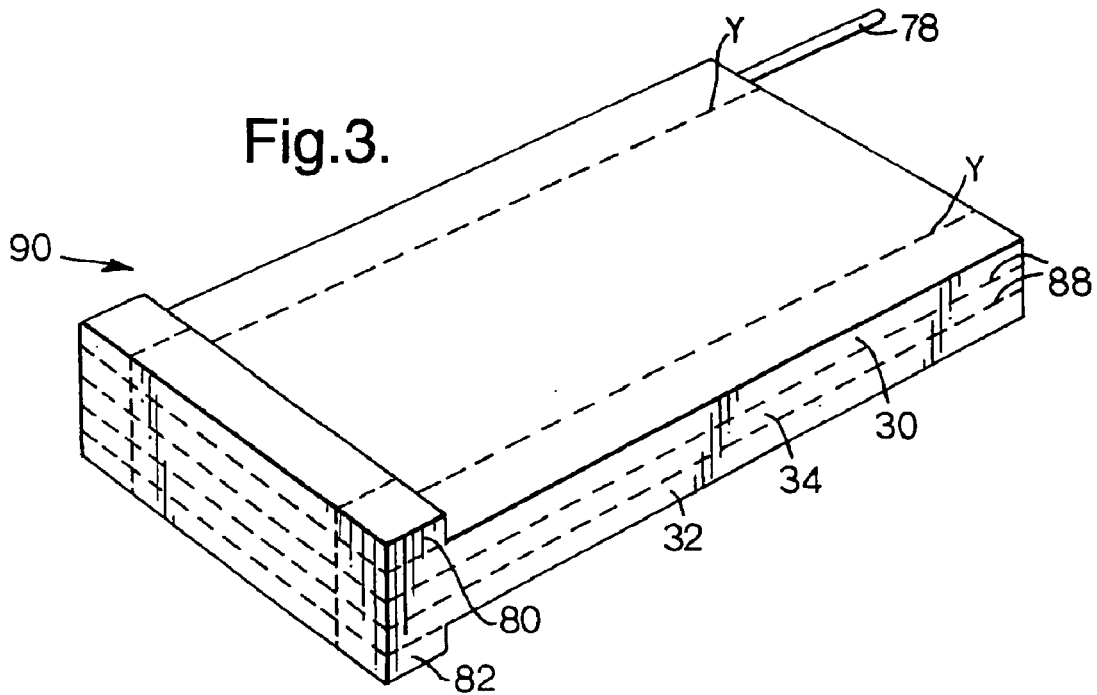

METHOD OF MANUFACTURING AN ARTICLE BY DIFFUSION BONDING

FIELD OF THE INVENTION

The present invention relates to a method of manufacturing an article by diffusion bonding and in particular to diffusion bonding and superplastic forming.

BACKGROUND OF THE INVENTION

It is known to manufacture hollow metallic articles by diffusion bonding and superplastic forming metal workpieces. These metal workpieces include elementary metal, metal alloys, intermetallic materials and metal matrix composites.

The diffusion bonding and superplastic forming process may be used to produce contoured articles for example fan blades, or fan duct outlet guide vanes, for gas turbine engines by superplastically, or hot forming, an integral structure formed by the diffusion bonding process.

A procedure for manufacturing an article by diffusion bonding and superplastic forming is disclosed in our European patent EP0568201B. In EP0568201B the integral structure formed by the diffusion bonding process is twisted before the integral structure is superplastically formed. Additionally the integral structure is hot creep formed in the superplastic forming dies.

There is a requirement to increase the thrust produced by gas turbine engines. This has lead to an increase in the size of the fan duct, or bypass duct, of the gas turbine engine with a consequential increase in the size of the fan blades and fan duct outlet guide vanes, in particular an increase in the length of the fan blade from root to tip.

The above mentioned manufacturing process consistently results in satisfactory fan blades and/or fan duct outlet guide vanes of present finished size, for example a length of approximately 0.9 m from root to tip for a fan blade. However, it has now been found that the above mentioned manufacturing process does not consistently result in satisfactory fan blades and/or fan duct outlet guide vanes of increased finished size, for example a length of approximately 1.0 m from root to tip for a fan blade.

It has been found that the diffusion bond produced between the metallic workpieces is unsatisfactory for the fan blades of increased size. The diffusion bond between the metallic workpieces forming a fan blade must be of very high quality in order to withstand the high stresses that the fan blade experiences in operation. It has been found that satisfactory diffusion bonds were not being consistently produced because all the air and any impurities between the metallic workpieces was not removed before the diffusion bonding process occurred. It is essential to diffusion bond the metallic workpieces with a vacuum therebetween in order to obtain a high quality diffusion bond.

SUMMARY OF THE INVENTION

Accordingly the present invention seeks to provide a novel method of manufacturing an article by diffusion bonding which overcomes the above mentioned problems.

Accordingly the present invention provides a method of manufacturing an article of predetermined finished profile by diffusion bonding at least two metal workpieces comprising the steps of:

(a) forming at least two metal workpieces, each metal workpiece has at least one flat surface, each metal workpiece is larger than a predetermined size in at least one direction parallel to the flat surface to form at least one excess portion, the predetermined size is that required to produce the outer profile of the finished article, the at least one excess portion being located outside the outer profile of the finished article, (b) forming at least one groove in the flat surface of the at least one excess portion of the at least one of the least two metal workpieces, (c) assembling the at least two metal workpieces into a stack relative to each other so that the flat surfaces are in mating abutment, (d) evacuating the stack such that the at least one groove enables at least more of the gases in the stack to be removed from the stack, and (e) applying heat and pressure across the thickness of the at least two metal workpieces to diffusion bond the at least two metal workpieces together to form an integral structure, (f) cutting the integral structure such as to remove the excess portions of the at least two metal workpieces and the at least one groove.

Preferably the at least two metal workpieces have first and second longitudinally spaced ends, each metal workpiece is larger than a predetermined size in a lateral direction perpendicular to the longitudinal direction between the first and second longitudinally spaced ends to form at least one excess portion, the at least one groove extends longitudinally between the first and second longitudinally spaced ends, evacuating the stack from the first end of the stack such that the at least one groove enables at least more of the gases at the second end of the stack to be removed from the stack.

Preferably the method comprises before step (d) additional step (g) applying a stop off material to prevent diffusion bonding to preselected areas of at least one of the flat surfaces of at least one of the at least two metal workpieces and after step (f) additional step (h) placing the integral structure in a superplastic forming die heating the integral structure and internally pressurising the integral structure while it is within the die to cause the preselected area of at least the second metal workpiece to be hot formed to produce a hollow article of predetermined shape.

Preferably the method comprises after step (f) and before step (h) placing the integral structure in a hot creep forming die, heating the integral structure while it is within the die to cause the integral structure to be hot creep formed on the convex surface of the die.

Preferably step (a) comprises forming a first metallic workpiece, a second metallic workpiece and a third metallic workpiece, the third metallic workpiece having two flat surfaces, and step (d) comprises assembling the three metal workpieces into the stack relative to each other so that third metal workpiece is between the first and second metal workpieces and the flat surfaces are in mating abutment.

Preferably step (a) comprise forming two excess portions on each of the first, second and third metallic workpieces.

Preferably step (b) comprises forming longitudinally extending slots through the third metallic workpiece to interconnect the flat surfaces of both excess portions of the third metal workpiece.

The hollow article may be a fan blade.

Alternatively step (a) comprises forming a first metallic workpiece and a second metallic workpiece.

Step (a) may comprise forming two excess portions on each of the first and second metallic workpieces.

Step (b) may comprise forming at least one longitudinally extending groove in the flat surface of both excess portions of the first metal workpiece.

Step (b) may comprise forming at least one longitudinally extending groove in the flat surface of both excess portions of the first metal workpiece and forming at least one longitudinally extending groove in the flat surface of both excess portions of the second metal workpiece.

Step (b) may comprise forming at least one longitudinally extending groove in the flat surface of one excess portion of the first metal workpiece and forming at least one longitudinally extending groove in the flat surface of one excess portion of the second metal workpiece.

Preferably step (a) comprises forming at least one aperture through a first end of the first metallic sheet, step (b) comprises forming the at least one longitudinally extending slot such that it interconnects with the at least one aperture and step (c) comprises stacking at least one additional metallic member on the first end of the first metallic sheet.

The hollow article may be a fan outlet guide vane.

Preferably the at least one longitudinally extending groove extends substantially the full length of the at least one of the at least two metal workpieces.

After diffusion bonding the stack of workpieces and before superplastically forming the integral structure, the integral structure may be heated and loads are applied to opposite ends of the integral structure to twist one end relative to the other end to contour the integral structure to a predetermined shape.

After twisting the integral structure and before superplastic forming the integral structure, the contoured integral structure may be internally pressurised to break the adhesive bond between the stop off material and the at least one workpiece in the preselected area.

Preferably after internally pressurising the integral structure to break the adhesive bond and before internally pressurising the integral structure to superplastically form at least one metal workpiece, the interior of the integral structure is sequentially evacuated and supplied with inert gas to remove oxygen from the interior of the integral structure.

Preferably after diffusion bonding the stack of workpieces and before superplastically forming the integral structure, the integral structure is internally pressurised to break the adhesive bond between the stop off material and the at least one workpiece in the preselected area.

Preferably after internally pressurising the integral structure to break the adhesive bond and before internally pressurising the integral structure to superplastically form at least one metal workpiece, the interior of the integral structure is sequentially evacuated and supplied with inert gas to remove oxygen from the interior of the integral structure.

Preferably after the metal workpieces are arranged in a stack and before the metal workpieces are diffusion bonded together to form an integral structure, the edges of the metal workpieces are sealed.

Preferably the edges of the metal workpieces are welded together.

Preferably where the metal workpieces are made of a titanium alloy, the metal workpieces are heated to a temperature equal to, or greater than, 850° C. and the pressure applied is equal to, or greater than, $20 \times 10^5$ Nm$^{-2}$ to diffusion bond the workpieces together to form an integral structure.

Preferably the metal workpieces are heated to a temperature between 900° C. and 950° C. and the pressure applied is between $20 \times 10^5$ Nm$^{-2}$ and $30 \times 10^5$ Nm$^{-2}$.

Preferably the integral structure is heated to a temperature equal to, or greater than, 850° C. to superplastically form the integral structure.

Preferably the integral structure is heated to a temperature between 900° C. and 950° C.

Preferably the integral structure is hot creep formed at a temperature equal to, or greater than, 740° C.

Preferably step (g) comprises water jet cutting.

BRIEF DESCRIPTION OF THE DRAWINGS

The present invention will be more fully described by way of example with reference to the accompanying drawings in which:

FIG. 2 illustrates an exploded view of a stack of three metal workpieces, which are superplastically formed, and diffusion bonded to form an article according to the present invention.

FIG. 3 is a perspective view of the stack of three metal workpieces shown in FIG. 2 showing the integral structure after the diffusion bonding step has been performed.

DETAILED DESCRIPTION OF THE INVENTION

Figure 1:
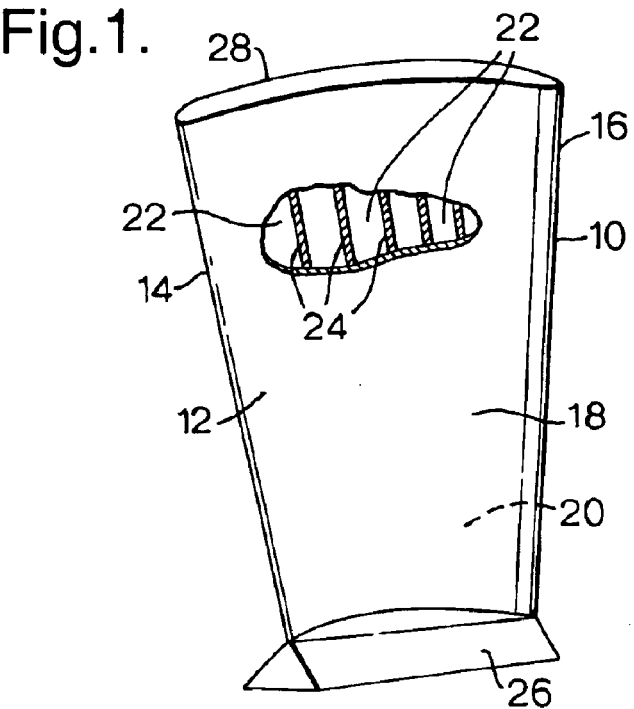
FIG. 1 shows an article manufactured by superplastic forming and diffusion bonding according to the present invention.

A turbofan gas turbine engine fan blade 10, shown in FIG. 1, comprises an aerofoil shaped body 12 which has a leading edge 14, a trailing edge 16, a concave surface 18, a convex surface 20, a root 26 and a tip 28. The fan blade 10 is hollow and comprises a plurality of spaces 22 within the aerofoil shaped body 12 separated by a warren girder structure 24.

In FIG. 2 three sheets of titanium alloy 30, 32 and 34 are assembled into a stack 36. The sheet 30 has a single flat surface 38, the sheet 32 has a single flat surface 42 and the sheet 34 has two flat surfaces 46 and 48. The flat surfaces 38 and 46 of the sheets 30 and 34 respectively are arranged to abut each other and the flat surfaces 42 and 48 of the sheets 32 and 34 respectively are arranged to abut each other.

Prior to assembling the sheets 30, 32 and 34 into the stack 36, the first sheet 30 is machined in a region 50 centrally of the surface 40 of the first sheet 30 and the second sheet 32 is machined in a region 52 centrally of the surface 44 of the second sheet 32. The central machined regions 50 and 54 are contoured to produce a variation in the mass distribution of the fan blade 10 from leading edge 14 to trailing edge 16 and from root 26 to tip 28 by varying the depth of machining. For example by varying the thickness of the first and second sheets 30 and 32, across the central machined region 50 and 52 in the direction between the edges 54 and 56 and in the direction between the ends 58 and 60 of the first and second sheets 32.

The machining of the central machined regions 50 and 52 of the first and second sheets 30 and 32 respectively is by milling, electrochemical machining, chemical machining, electrodischarge machining or any other suitable machining process.

Each of the three sheets 30, 32 and 34 is originally formed such that it is larger than a predetermined distance X in the plane parallel to the flat surfaces 38, 42 and 46 respectively in a lateral direction between the edges 54 and 56 and perpendicularly to a longitudinal direction between the ends 58 and 60 so to form at least one excess portion 62A, 62B, 64A, 64B, and 66A, 66B on each of the three sheets 30, 32 and 34 respectively. The distance X is that required to produce the outer profile of the finished article 10. The excess portions 62A, 62B, 64A, 64B, 66A and 66B of the three sheets 30, 32 and 34 extend longitudinally between the ends 58 and 60 and are located outside the outer profile of the finished article 10.

The third sheet 34 is machined to produce two longitudinally extending slots 68, which extend a substantial part of the full length of the third sheet 34 but are spaced from the ends 58 and 60. The slots 68 are machined through the excess portions 66A and 66B of the third sheet 34 from the surface 46 of the surface 48.

The abutting surfaces 38 and 46 of the sheets 30 and 34 and the abutting surfaces 42 and 48 of the sheets 32 and 34 respectively are then prepared for diffusion bonding by chemical cleaning. One of the abutting surfaces 38 and 46, in this example abutting surface 46, has had a stop off material 70 applied. Similarly one of the abutting surfaces 42 and 48, in this example abutting surface 48, has had a stop off material 70 applied. The stop off material 70 may comprise powdered yttria in a binder and solvent e.g. the stop off known as "Stopyt 62A" which is sold by an American company named GTE Service Corporation of 100 Endecott Street, Danvers, Mass. 10923, USA.

The stop off material 70 is applied in desired patterns, by the known silk screen printing process. The desired patterns of stop off material 70 prevent diffusion bonding between preselected areas of the sheets 30, 32 and 34. In this example the stop off material 70 is applied in straight lines on the surfaces 46 and 48 of the sheet 34 except for regions adjacent the edges 54 and 56 and ends 58 and 60 sufficient to provide a satisfactory diffusion bond.

The sheet 30 has a pair of dowel holes 72, which are axially aligned with corresponding dowel holes 74 in sheet 32 and dowel holes 76 in sheet 34 to ensure the correct positional relationship between the three sheets 30, 32 and 34. The sheets 30, 32 and 34 are maintained in this positional relationship by a pair of dowels (not shown) which are inserted into the axially aligned dowel holes 72, 74 and 76.

Additionally additional metal blocks 80 and 82 are arranged at a first end of the surfaces 40 and 44 of the sheets 30 and 32 respectively to form the root 26 of the fan blade 10. A number of apertures 84 and 86 are machined through the first ends of the sheets 30 and 32 to allow the interface between the blocks 80 and the sheets 30 and 32 to be evacuated. The apertures 84 and 86 are so positioned to interconnect with the slots 68 in the excess portions 66A and 66B of the third sheet 34.

The sheets 30, 32 and 34 of the stack 36 are placed together to trap an end of a pipe 78. In this example a groove is machined on surface 38 of the first sheet 30 and a groove is machined on surface 42 of the second sheet 32 and a slot is machined in the third sheet 34. The pipe 78 is positioned to project from between the three sheets 30, 32 and 34. One end of the pipe 78 interconnects with the pattern of stop off material 70 between the sheets 30, 32 and 34. On completion of the assembly in the manner described it is welded about its periphery so as to weld the edges and ends of sheets 30, 32 and 34 together. The edges and ends of the blocks 80 and 82 are welded to the edges, ends and surfaces 40 and 44 of the sheets 30 and 32 respectively. The pipe 78 is also welded around its periphery to the sheets 30, 32 and 34. A sealed assembly is formed except for the inlet provided by the pipe 78.

It is to be noted that the pipe 78 is located at one end, in this example the end, which subsequently forms the tip 28 of the fan blade 10, of the sealed assembly. The slots 68 extend longitudinally towards the other end of the sealed assembly, in this example the end, which subsequently forms the root 26 of the fan blade 10, to provide a path for the removal of air from the other opposite end of the sealed assembly.

The pipe 78 is then connected to a vacuum pump which is used to evacuate the interior of the sealed assembly and then inert gas, for example argon, is supplied to the interior of the sealed assembly. This evacuating and supplying inert gas to the interior of the sealed assembly may be repeated several times in order to ensure that most, or substantially all, traces of oxygen and any impurities are removed from the interior of the sealed assembly. The particular number of times that the interior of the sealed assembly is evacuated and purged with inert gas depends upon the size of the workpieces and upon the required integrity of the finished component or article. The smaller the traces of oxygen and any impurities remaining, the greater is the quality of the subsequent diffusion bond. The inert gas is supplied to pressurise the interior of the sealed assembly to atmospheric pressure.

The longitudinally extending slots 68 in the third sheet 34 enable the whole of the interior of the sealed assembly to be evacuated. In particular between the surfaces 38 and 46 of the sheets 30 and 34, between the surfaces 42 and 48 of the sheets 32 and 34, between the block 80 and surface 40 of sheet 30 and between the block 82 and surface 44 of sheet 32. The slots 68 enable the end of the sealed assembly remote from the pipe 78 to be evacuated.

The sealed assembly is evacuated and is placed in an oven. The sealed assembly is then heated to a temperature between 250° C. and 350° C. to evaporate the binder from the stop off material. During the baking out of the binder, the sealed assembly is continuously evacuated to remove the binder from between the sheets 30, 32 and 34. After the binder has been removed, which is determined either by monitoring the binder levels in the gas extracted from the sealed assembly or by maintaining the sealed assembly at the temperature between 250° C. and 350° C. for a predetermined time, the sealed assembly is removed from the oven and is allowed to cool to ambient temperature whilst being continuously evacuated. The binder is baked out of the sealed assembly at a suitably low temperature to reduce, or prevent, oxidation of the exterior surface of the sealed assembly. The slots 68 allow the removal of binder from the whole of the sealed assembly, in particular from the end of the sealed assembly remote from the pipe 78.

The pipe 78 is then sealed so that there is a vacuum in the sealed assembly. The sealed assembly is then transferred carefully to an autoclave. The temperature in the autoclave is increased such that the sealed assembly is heated to a temperature greater than 850° C. and the argon pressure in the autoclave is raised to greater than 20 atmospheres, 294 pounds per square inch ($20.26 \times 10^5$ $Nm^{-2}$) and held at that temperature and pressure for a predetermined time. Preferably the sealed assembly is heated to a temperature between 900° C. and 950° C. and the pressure is between 294 pounds per square inch ($20.26 \times 10^5 Nm^{-2}$) and 441 pounds per square inch ($30.39 \times 10^5 Nm^{-2}$). For example if the sealed assembly is heated to a temperature of 925° C. and the pressure is raised to 300 pounds per square inch the temperature and pressure are held constant for about two hours. The pressure is then reduced to ambient, diffusion bonding having been achieved and the sealed assembly, which is then an integral structure 90, is removed from the autoclave. The diffusion bonding has occurred at regions 88 indicated by dashed lines and diffusion bonding has been prevented at regions as shown in FIG. 3.

The excess portions 62A, 62B, 64A, 64B, 66A and 66B of the three sheets 30, 32 and 34 are then cut off from the three sheets 30, 32 and 34 along lines Y by any suitable machining process, for example water jet machining as shown in FIG. 3.

The leading edge 14 and trailing edge 16 of the fan blade 10 are machined, by any suitable process, approximately to shape after diffusion bonding as shown in FIG. 3.

The pipe 78 is removed from the integral structure 90 and a second pipe is fitted to the integral structure 90.

The integral structure 90 is then placed in a hot creep forming die and the integral structure 90 is heated while it is within the die to cause the integral structure 90 to be hot creep to produce an aerofoil shape. During the hot creep forming process the integral structure is heated to a temperature of 740° C.

The hot creep formed integral structure 90 is then placed in a superplastic forming die, which comprises a concave surface and a convex surface. Inert gas, for example argon, is introduced into the areas, within the hot creep formed integral structure 90, containing the stop off material 78 in order to break the adhesive grip, which the diffusion bonding pressure has brought about. The argon is carefully introduced to those areas which contain the stop off material 78, and the argon seeps through the stop off material 78 and eventually reaches the opposing end of the hot creep formed integral structure 90. The argon must travel the whole length of the interior of the hot creep formed integral structure 90 such as to break the adhesive grip between the stop off material and the workpieces 30,32 and 34 brought about during the diffusion bonding step.

This step may be carried out at room temperature because the metal is elastic at room temperature and the minimal extension, which occurs, does not go beyond the elastic limit. Consequently the hot creep formed integral structure 90 regains its shape when pressure is removed at the end of the step. Alternatively the step may be carried out at the superplastic forming temperature, however there is a serious risk of progressive plastic deformation lengthwise of the hot creep formed integral structure 90, rather than simultaneous deformation over the whole of the hot creep formed integral structure 90. Nevertheless the skilled artisan will be able to control the breaking of the adhesive grip by suitable control of the pressure of the argon.

The second pipe is then connected to a vacuum pump which is used to evacuate the interior of the hot creep formed integral structure 90 and then inert gas, for example argon, is supplied to the interior of the hot creep formed integral structure 90. This process of evacuating and supplying inert gas to the interior of the hot creep formed integral structure 90 may be repeated several times in order to ensure that most, or substantially all, traces of oxygen are removed from the interior of the hot creep formed integral structure 90. The particular number of times that the interior of the hot creep formed integral structure 90 is evacuated and purged with inert gas depends upon the size of the workpieces and upon the required integrity of the finished component. The inert gas is supplied to pressurise the interior of the hot creep formed integral structure 90 to atmospheric pressure.

The hot creep formed integral structure 90 and superplastic forming die is placed in an autoclave. The hot creep formed integral structure 90 is again heated to a temperature greater than 850° C., preferably between 900° C. and 950° C. In this example, the dies and hot creep formed integral structure 90 are heated to 925° C. Inert gas, for example argon, is introduced into the interior of the hot creep formed integral structure 90 between the sheets 30, 32 and 34, so as to hot form the sheets 30 and 34 onto the surfaces of the die which superplastically forms the sheet 34 to generate a hollow internal structure depending on the pattern of the applied stop off material 70.

The magnitude of the movement of at least one of the sheets during deformation is such as to require superplastic extension to occur. The term "superplastic" is a standard term in the metal forming art and will not be described herein.

In order to achieve superplastic forming without rupturing the thinning metal the argon is introduced in a series of pulses, at a pre-calculated rate which will achieve a desired strain rate, as is taught at pp 615–623 in the book "The Science, Technology and Application of Titanium" edited by R. I. Jaffe and N. E. Promisel, published by Pergamon Press in 1970, which is hereby incorporated by reference. The method ensures that the metal is subjected to that strain rate which will achieve the maximum permissible speed of extension at any given point in the procedure. The rate of application, and/or volume of the pulses of the gas pulses may thus vary during the expansion of the sheets 72 and 74.

On completion of hot forming/superplastic forming, the inert argon atmosphere within the integral structure is maintained whilst the structure is cooled. The integral structure is then machined and/or ground to remove excess metal and to produce the required leading edge and trailing edge shapes of the finished fan blade 10.

The advantage of using the slots 68 in the excess portions 66A and 66B of the third sheet 34 is that they enable satisfactory diffusion bonds to be consistently produced because all the air and any impurities between the metallic workpieces is removed before the diffusion bonding process occurred. It is essential to diffusion bond metallic workpieces with a vacuum therebetween in order to obtain a high quality diffusion bond.

It was found that a sealed assembly comprising longer and thinner, and hence more flexible, workpieces than currently used became self-sealing during evacuation and therefore all the air and impurities could not be removed from the sealed assembly.

Figure 4:
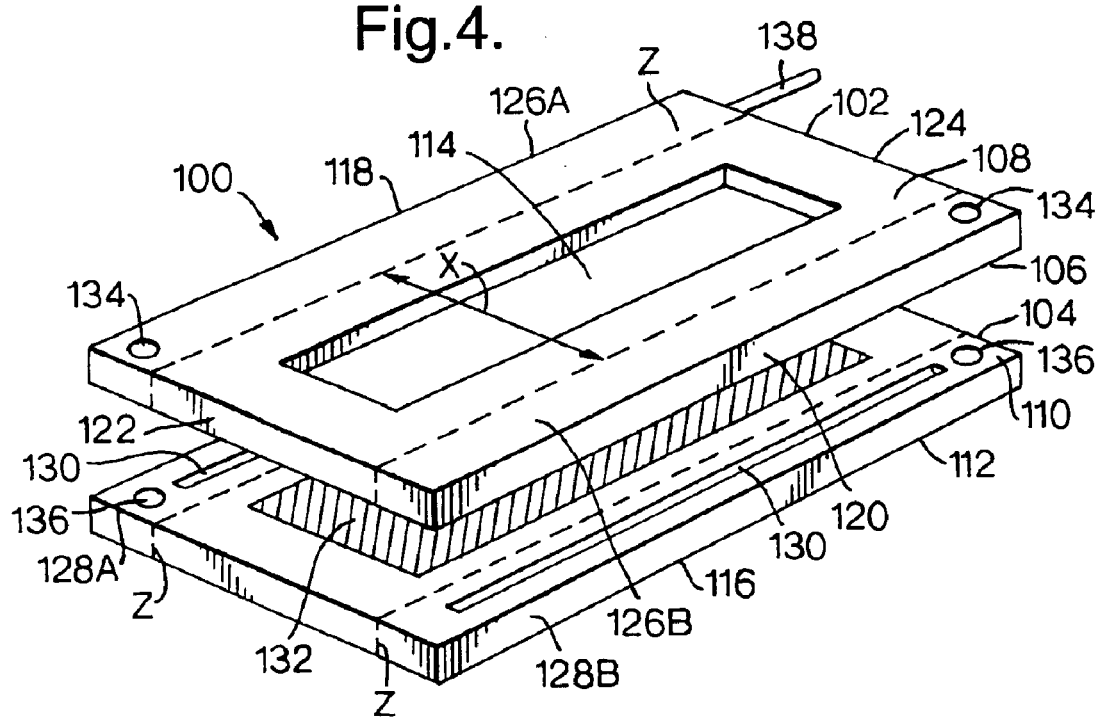
FIG. 4 illustrates an exploded view of a stack of two metal workpieces, which are superplastically formed, and diffusion bonded to form an article according to the present invention.

Another embodiment of the invention is shown in FIG. 4. In this embodiment two sheets of titanium alloy 102 and 104 are assembled into a stack 100 as shown in FIG. 4. The sheet 102 has a flat surface 106 and the sheet 104 has flat a surface 110. The flat surfaces 106 and 110 of the sheets 102 and 104 respectively are arranged to abut each other.

Prior to assembling the sheets 102 and 104 into the stack 100, the first and second sheets 102 and 104 are machined in region 114 and 116 centrally of the surfaces 108 and 110 of the first and second sheets 102 and 104 respectively. The central machined regions 114 and 116 are contoured to produce a variation in the mass distribution of a fan outlet guide vane from leading edge to trailing edge and from root to tip by varying the depth of machining. For example by varying the thickness of the first and second sheets 102 and 104 respectively, across the central machined regions 114 and 116 in the direction between the edges 118 and 120 and in the direction between the ends 122 and 124 of the first and second sheets 102 and 104.

The machining of the central machined regions 114 and 116 of the first and second sheets 102 and 104 is by milling, electrochemical machining, chemical machining, electrodischarge machining or any other suitable machining process.

Each of the two sheets 102 and 104 are originally formed such that they are larger than a predetermined distance X in the plane parallel to the flat surfaces 106 and 110 respectively in a lateral direction between the edges 118 and 120 and perpendicularly to a longitudinal direction between the ends 122 and 124 so to form at least one excess portion 126A, 126B and 128A, 128B on each of the two sheets 102 and 104 respectively. The distance X is that required to produce the outer profile of the finished article 10. The excess portions 126A, 126B, 128A and 128B extend longitudinally between the ends 122 and 124 of the two sheets 102 and 104 respectively and are located outside the outer profile of the finished article 10.

One of the first and second sheets 102 and 104, in this example second sheet 104 is machined to produce two longitudinally extending grooves 130 which extend a substantial part of the full length of the second sheet 104 but are spaced from the ends 122 and 124. The grooves 130 are machined in the excess portions 128A and 128B of the second sheet 104 in the flat surface 110 but the grooves 130 do not extend all the way through the second sheet 104. Alternatively aligning grooves may be machined in the excess portions 126A, 126B, 128A and 128B on the surfaces 106 and 110 of the first and second sheets 102 and 104 respectively.

The abutting surfaces 106 and 110 of the sheets 102 and 10 respectively are then prepared for diffusion bonding by chemical cleaning. One of the abutting surfaces 106 and 110, in this example abutting surface 110, has had a stop off material 132 applied. The stop off material 132 may comprise powdered yttria in a binder and solvent e.g. the stop off known as "Stopyt 62A" which is sold by an American company named GTE Service Corporation of 100 Endecott Street, Danvers, Mass. 10923, USA.

The stop off material 132 is applied in desired patterns, by the known silk screen printing process. The desired patterns of stop off material 132 prevent diffusion bonding between preselected areas of the sheets 102 and 104. In this example the stop off material 132 is applied centrally of the surface 110 of the sheet 104 except for regions adjacent the edges 118 and 120 and ends 122 and 124 sufficient to provide a satisfactory diffusion bond.

The sheet 102 has a pair of dowel holes 134, which are axially aligned with corresponding dowel holes 136 in sheet 104 to ensure the correct positional relationship between the two sheets 102 and 104. The sheets 102 and 104 are maintained in this positional relationship by a pair of dowels (not shown) which are inserted into the axially aligned dowel holes 134 and 136.

The sheets 102 and 104 of the stack 100 are placed together to trap an end of a pipe 138. In this example a groove is machined on surface 106 of the first sheet 102 and a groove is machined on surface 110 of the second sheet 104. The pipe 138 is positioned to project from between the two sheets 102 and 104. One end of the pipe 138 interconnects with the pattern of stop off material 132 between the sheets 102 and 104. On completion of the assembly in the manner described it is welded about its periphery so as to weld the edges and ends of sheets 102 and 104 together. The pipe 138 is also welded around its periphery to the sheets 102 and 104. A sealed assembly is formed except for the inlet provided by the pipe 138.

It is to be noted that the pipe 138 is located at one end, in this example the end, which subsequently forms the tip of the fan outlet guide vane, of the sealed assembly. The slots 130 extend longitudinally towards the other end of the sealed assembly, in this example the end which subsequently forms the root of the fan outlet guide vane, to provide a path for the removal of air from the other opposite end of the sealed assembly.

The pipe 138 is then connected to a vacuum pump which is used to evacuate the interior of the sealed assembly and then inert gas, for example argon, is supplied to the interior of the sealed assembly. This evacuating and supplying inert gas to the interior of the sealed assembly may be repeated several times in order to ensure that most, or substantially all, traces of oxygen and any impurities are removed from the interior of the sealed assembly. The particular number of times that the interior of the sealed assembly is evacuated and purged with inert gas depends upon the size of the workpieces and upon the required integrity of the finished component or article. The smaller the traces of oxygen and any impurities remaining, the greater is the quality of the subsequent diffusion bond. The inert gas is supplied to pressurise the interior of the sealed assembly to atmospheric pressure.

The longitudinally extending slots 130 in the second sheet 104 enable the whole of the interior of the sealed assembly to be evacuated, in particular between the surfaces 106 and 110 of the sheets 102 and 104. The slots 130 enable the end of the sealed assembly remote from the pipe 138 to be evacuated.

The sealed assembly is evacuated and is placed in an oven. The sealed assembly is then heated to a temperature between 250° C. and 350° C. to evaporate the binder from the stop off material. During the baking out of the binder, the sealed assembly is continuously evacuated to remove the binder from between the sheets 102 and 104. After the binder has been removed, which is determined either by monitoring the binder levels in the gas extracted from the sealed assembly or by maintaining the sealed assembly at the temperature between 250° C. and 350° C. for a predetermined time, the sealed assembly is removed from the oven and is allowed to cool to ambient temperature whilst being continuously evacuated. The binder is baked out of the sealed assembly at a suitably low temperature to reduce, or prevent, oxidation of the exterior surface of the sealed assembly. The slots 130 allow the removal of binder from the whole of the sealed assembly, in particular from the end of the sealed assembly remote from the pipe 138.

The pipe 138 is then sealed so that there is a vacuum in the sealed assembly. The sealed assembly is then transferred carefully to an autoclave. The temperature in the autoclave is increased such that the sealed assembly is heated to a temperature greater than 850° C. and the argon pressure in the autoclave is raised to greater than 20 atmospheres, 294 pounds per square inch ($20.26 \times 10^5 Nm^{-2}$) and held at that temperature and pressure for a predetermined time. Preferably the sealed assembly is heated to a temperature between 900° C. and 950° C. and the pressure is between 294 pounds per square inch ($20.26 \times 10^5 Nm^{-2}$) and 441 pounds per square inch ($30.39 \times 10^5 Nm^{-2}$). For example if the sealed assembly is heated to a temperature of 925° C. and the pressure is raised to 300 pounds per square inch the temperature and pressure are held constant for about two hours. The pressure is then reduced to ambient, diffusion bonding having been achieved and the sealed assembly, which is then an integral structure, is removed from the autoclave.

The excess portions 126A, 126B, 128A and 128B of the two sheets 102 and 104 are then cut off from the two sheets 102 and 104 along lines Y by any suitable machining process, for example water jet machining.

The leading edge and trailing edge of the fan outlet guide vane are machined, by any suitable process, approximately to shape after diffusion bonding.

The pipe 138 is removed from the integral structure and a second pipe is fitted to the integral structure.

The integral structure is then placed in a hot creep forming die and the integral structure is heated while it is within the die to cause the integral structure to be hot creep to produce an aerofoil shape. During the hot creep forming process the integral structure is heated to a temperature of 740° C.

The hot creep formed integral structure is then placed in a superplastic forming die, which comprises a concave surface and a convex surface. Inert gas, for example argon, is introduced into the areas, within the hot creep formed integral structure, containing the stop off material 132 in order to break the adhesive grip, which the diffusion bonding pressure has brought about. The argon is carefully introduced to those areas which contain the stop off material 132, and the argon seeps through the stop off material 132 and eventually reaches the opposing end of the hot creep formed integral structure. The argon must travel the whole length of the interior of the hot creep formed integral structure such as to break the adhesive grip between the stop off material 132 and the workpieces 102 and 104 brought about during the diffusion bonding step.

This step may be carried out at room temperature because the metal is elastic at room temperature and the minimal extension, which occurs, does not go beyond the elastic limit. Consequently the hot creep formed integral structure regains its shape when pressure is removed at the end of the step. Alternatively the step may be carried out at the superplastic forming temperature, however there is a serious risk of progressive plastic deformation lengthwise of the hot creep formed integral structure, rather than simultaneous deformation over the whole of the hot creep formed integral structure. Nevertheless the skilled artisan will be able to control the breaking of the adhesive grip by suitable control of the pressure of the argon.

The second pipe is then connected to a vacuum pump which is used to evacuate the interior of the hot creep formed integral structure and then inert gas, for example argon, is supplied to the interior of the hot creep formed integral structure. This process of evacuating and supplying inert gas to the interior of the hot creep formed integral structure may be repeated several times in order to ensure that most, or substantially all, traces of oxygen are removed from the interior of the hot creep formed integral structure. The particular number of times that the interior of the hot creep formed integral structure 90 evacuated and purged with inert gas depends upon the size of the workpieces and upon the required integrity of the finished component. The inert gas is supplied to pressurise the interior of the hot creep formed integral structure to atmospheric pressure.

The hot creep formed integral structure and superplastic forming die is placed in an autoclave. The hot creep formed integral structure is again heated to a temperature greater than 850° C., preferably between 900° C. and 950° C. In this example, the dies and hot creep formed integral structure are heated to 925° C. Inert gas, for example argon, is introduced into the interior of the hot creep formed integral structure between the sheets 102 and 104, so as to hot form the sheets 102 and 104 onto the surfaces of the die to generate a hollow internal structure depending on the pattern of the applied stop off material 132.

On completion of hot forming/superplastic forming, the inert argon atmosphere within the integral structure is maintained whilst the structure is cooled. The integral structure is then machined and/or ground to remove excess metal and to produce the required leading edge and trailing edge shapes of the finished fan outlet guide vane.

The advantage of using the slots 130 in the excess portions 128A and 128B of the second sheet 104 is that they enable satisfactory diffusion bonds to be consistently produced because all the air and any impurities between the metallic workpieces is removed before the diffusion bonding process occurred. It is essential to diffusion bond metallic workpieces with a vacuum therebetween in order to obtain a high quality diffusion bond.

Although the description has referred to fan outlet guide vanes and fan blades the invention is equally applicable to other article or components which have contoured surfaces.

Although the description has referred to titanium sheets, or workpieces, the invention is equally applicable to other metal sheets, or workpieces, which may be hot formed or superplastically formed.

Although the description has referred to the use of slots in the third sheet for the fan blade, it may be possible to use grooves in the excess portions of the first, second or third sheets. For example grooves may be provided in the first sheet and grooves may be provided in the second sheet. Alternatively grooves may be provided on the third sheet or aligned grooves may be provided on the first, second and third sheets.

Although the invention has been described with reference to manufacturing articles above a predetermined size it may be possible to use the invention in manufacturing articles below the predetermined size to obtain enhanced diffusion bond quality in the manufactured article.

Although the invention has been described with reference to evacuating the stack of workpieces from one longitudinal end of the stack it may be possible to evacuate at a position intermediate the ends of the stack and to provide longitudinal grooves and/or lateral grooves in excess portions to enable more gases to be removed from the stack.

We claim:

1. A method of manufacturing an article of predetermined finished profile by diffusion bonding at least two metal workpieces comprising the steps of:
   (a) forming at least two metal workpieces, each metal workpiece has at least one flat surface, each metal workpiece is larger than a predetermined size in at least one direction parallel to the flat surface to form at least one excess portion, the predetermined size is that required to produce the outer profile of the finished article, the at least one excess portion being located outside the outer profile of the finished article,
   (b) forming at least one groove in the flat surface of the at least one excess portion of the at least one of the least two metal workpieces,
   (c) assembling the at least two metal workpieces into a stack relative to each other so that the flat surfaces are in mating abutment,
   (d) evacuating the stack such that the at least one groove enables at least more of the gases in the stack to be removed from the stack, and
   (e) applying heat and pressure across the thickness of the at least two metal workpieces to diffusion bond the at least two metal workpieces together to form an integral structure,
   (f) cutting the integral structure such as to remove the excess portions of the at least two metal workpieces and the at least one groove.

2. A method as claimed in claim 1 wherein the at least two metal workpieces have first and second longitudinally spaced ends, each metal workpiece is larger than a predetermined size in a lateral direction perpendicular to the longitudinal direction between the first and second longitudinally spaced ends to form at least one excess portion, the at least one groove extends longitudinally between the first and second longitudinally spaced ends, evacuating the stack from the first end of the stack such that the at least one groove enables at least more of the gases at the second end of the stack to be removed from the stack.

3. A method as claimed in claim 1 comprising before step (d) additional step (g) applying a stop off material to prevent diffusion bonding to preselected areas of at least one of the flat surfaces of at least one of the at least two metal workpieces and after step (f) additional step (h) placing the integral structure in a superplastic forming die heating the integral structure and internally pressurising the integral structure while it is within the die to cause the preselected area of at least the second metal workpiece to be hot formed to produce a hollow article of predetermined shape.

4. A method as claimed in claim 3 comprising after step (f) and before step (h) placing the integral structure in a hot creep forming die, heating the integral structure while it is within the die to cause the integral structure to be hot creep formed on the convex surface of the die.

5. A method as claimed in claim 1 wherein step (a) comprises forming a first metallic workpiece, a second metallic workpiece and a third metallic workpiece, the third metallic workpiece having two flat surfaces, and step (c) comprises assembling the three metal workpieces into the stack relative to each other so that third metal workpiece is between the first and second metal workpieces and the flat surfaces are in mating abutment.

6. A method as claimed in claim 5 wherein step (a) comprises forming two excess portions on each of the first, second and third metallic workpieces.

7. A method as claimed in claim 6 wherein step (b) comprises forming longitudinally extending slots through the third metallic workpiece to interconnect the flat surfaces of both excess portions of the third metal workpiece.

8. A method as claimed in claim 1 wherein the article is a fan blade.

9. A method as claimed in claim 1 wherein step (a) comprises forming a first metallic workpiece and a second metallic workpiece.

10. A method as claimed in claim 9 wherein step (a) comprises forming two excess portions on each of the first and second metallic workpieces.

11. A method as claimed in claim 10 wherein step (b) comprises forming at least one longitudinally extending groove in the flat surface of both excess portions of the first metal workpiece.

12. A method as claimed in claim 10 wherein step (b) comprises forming at least one longitudinally extending groove in the flat surface of both excess portions of the first metal workpiece and forming at least one longitudinally extending groove in the flat surface of both excess portions of the second metal workpiece.

13. A method as claimed in claim 10 wherein step (b) comprises forming at least one longitudinally extending groove in the flat surface of one excess portion of the first metal workpiece and forming at least one longitudinally extending groove in the flat surface of one excess portion of the second metal workpiece.

14. A method as claimed in claim 1 wherein the hollow article is a fan outlet guide vane.

15. A method as claimed in claim 1 wherein step (a) comprises forming at least one aperture through a first end of the first metallic sheet, step (b) comprises forming the at least one longitudinally extending slot such that it interconnects with the at least one aperture and step (c) comprises stacking at least one additional metallic member on the first end of the first metallic sheet.

16. A method as claimed in claim 1 wherein the at least one longitudinally extending groove extends substantially the full length of the at least one of the at least two metal workpieces.

17. A method as claimed in claim 3 wherein after diffusion bonding the stack of workpieces and before superplastically forming the integral structure, the integral structure is heated and loads are applied to opposite ends of the integral structure to twist one end relative to the other end to contour the integral structure to a predetermined shape.

18. A method as claimed in claim 17 wherein after twisting the integral structure and before superplastic forming the integral structure, the contoured integral structure is internally pressurised to break the adhesive bond between the stop off material and the at least one workpiece in the preselected area.

19. A method as claimed in claim 18 wherein after internally pressurising the integral structure to break the adhesive bond and before internally pressurising the integral structure to superplastically form at least one metal workpiece, the interior of the integral structure is sequentially evacuated and supplied with inert gas to remove oxygen from the interior of the integral structure.

20. A method as claimed in claim 3 wherein after diffusion bonding the stack of workpieces and before superplastically forming the integral structure, the integral structure is internally pressurised to break the adhesive bond between the stop off material and the at least one workpiece in the preselected area.

21. A method as claimed in claim 20 wherein after internally pressurising the integral structure to break the adhesive bond and before internally pressurising the integral structure to superplastically form at least one metal workpiece, the interior of the integral structure is sequentially evacuated and supplied with inert gas to remove oxygen from the interior of the integral structure.

22. A method as claimed in claim 1 wherein after the metal workpieces are arranged in a stack and before the metal workpieces are diffusion bonded together to form an integral structure, the edges of the metal workpieces are sealed.

23. A method as claimed in claim 22 wherein the edges of the metal workpieces are welded together.

24. A method as claimed in claim 1 wherein where the metal workpieces are made of a titanium alloy, the metal workpieces are heated to a temperature equal to, or greater than, 850° C. and the pressure applied is equal to, or greater than, $20 \times 10^5$ $Nm^{-2}$ to diffusion bond the workpieces together to form an integral structure.

25. A method as claimed in claim 24 wherein the metal workpieces are heated to a temperature between 900° C. and 950° C. and the pressure applied is between $20 \times 10^5$ $Nm^{-2}$ and $30 \times 10^5$ $Nm^{-2}$.

26. A method as claimed in claim 3 wherein the integral structure is heated to a temperature equal to, or greater than, 850° C. to superplastically form the integral structure.

27. A method as claimed in claim 26 wherein the integral structure is heated to a temperature between 900° and 950° C.

28. A method as claimed in claim 4 wherein the integral structure is hot creep formed at a temperature equal to, or greater than, 740° C.

29. A method as claimed in claim 1 wherein step (f) comprises water jet cutting.

* * * * *